Patented Dec. 27, 1927.

1,654,103

UNITED STATES PATENT OFFICE.

NORMAN W. THOMSON, OF PARLIN, NEW JERSEY, ASSIGNOR TO E. I. DU PONT DE NEMOURS & COMPANY, OF WILMINGTON, DELAWARE, A CORPORATION OF DELAWARE.

METHOD OF CONDENSATION.

No Drawing. Application filed March 19, 1925. Serial No. 16,859.

This invention relates broadly to the production of higher condensation products from substances of low boiling point relative to the end products produced. More particularly it relates to the production of ketonic alcohols by the condensation of ketones in the presence of a suitable catalyst. And, specifically, although not confined thereto, it relates to the production of diacetone alcohol by the condensation of acetone, using an alkaline condensing agent.

It has heretofore been proposed to condense acetone to diacetone alcohol, using an alkaline condensing agent, but the procedure involved the use of a water solution of the agent, for example, sodium or potassium hydroxide. The use of water entailed difficulty of control, a tendency to form undesirable by-products, poor yield, and various other disadvantages. I have devised a process whereby these difficulties are avoided. It is the major object of the inventon to provide such a process.

In accordance with the present invention there is used a suspension of the catalyst, for example, caustic potash, in an inert liquid hydrocarbon which is a non-solvent for the catalyst but is miscible with acetone, as benzol, toluol, xylol, solvent naphtha, or gasoline and similar paraffin hydrocarbons, dispensing with the use of water, or other solvent for the condensing agent. In further accordance with the invention, the catalyst may be dispersed in the presence of an extender which is non-reactive with the catalyst, the acetone, and the diacetone alcohol, such as fuller's earth, slate, talc, soapstone, alumina, gypsum, asbestine kieselguhr, clay, and earthy and siliceous materials in general.

In the procedure, the use of a liquid other than water gives important advantages as under given conditions the yield of diacetone alcohol is greater, and there is less tendency to form undesirable by-products; and when, too, as indicated, the liquid used is a non-solvent for the catalyst, so that a suspension of the catalyst is used rather than a solution thereof, the velocity of the reaction is greater than when using a solution of the catalyst. Wherefore, by the use of a suitable inert liquid, as indicated, not only are the disadvantages of using water eliminated but, further, distinct advantage is obtained over using a liquid which although other than water yet is a solvent for the catalyst, as using an aliphatic alcohol, for example, methyl alcohol, as a solvent in cases where an alkali metal hydroxide is the catalytic agent. Furthermore, the product secured when carrying out the reaction under given conditions and using an inert liquid, possesses a higher specific gravity and boiling range than does that which can be secured when using an aliphatic alcohol solvent for the catalytic agent, indicating a larger percentage of high boiling material, that is, more actual diacetone alcohol. Also, of course, liquids of the character indicated are cheaper than methyl alcohol, and more readily removed if removal thereof should be desirable in any particular case. As to the extender, it appears to facilitate the dispersion, the mixture of catalytic agent and extender, suspended in inert liquid, appearing to function even more satisfactorily than a suspension of catalytic agent alone.

Without restricting the invention thereto, the following will serve as an example of practical working of the process:—A suspension of 10 parts (by weight) of caustic potash in 90 parts of benzol is prepared in any suitable manner, as by grinding the caustic and benzol in a ball mill. (The suspension looks milky and settles only very slowly.) One part of this mixture is added to 99 parts of acetone and set aside for several hours, or the mixture may be agitated if desired. When the reaction has continued as long as desirable and practical, as explained below, the potash is neutralized with a suitable acid, such as hydrochloric, preferably in alcoholic solution, although any acid may be used which will give a salt essentially insoluble in the ketone. The resulting precipitate is removed by filtration, and unconverted acetone removed by distilling through a column. The residue consists of diacetone alcohol containing a little acetone and may be further purified, if desired, by distillation. The benzol comes over with the acetone during the fractionation to obtain the diacetone alcohol. Although it forms a binary with acetone at approximately 58° C., this vapor phase can be broken up by the use of efficient fractionating columns, and the benzol separated from the acetone.

Relative to the carrying on of the reaction, it is desirable to carry it to the equilibrium point where the percentage of diacetone alcohol ceases to increase or does so but very slowly, thus to obtain the maximum yield at the temperature used. At a temperature of 4° C. the equilibrium point is established at the end of about twelve hours. At ordinary temperatures, that is 25° to 30° C., equilibrium is obtained in but a few hours, that is, about four or five. At temperatures higher than normal the reaction is still more rapid, though the process is less under control and the yields are smaller. Relatively low temperatures are desirable from the standpoint of yield; for instance, while at temperatures of 25° to 30° C. a yield of 10 to 16% may be obtained, at −6° to −29° C. approximately 30% conversion may be secured. It will be evident, then, to those skilled in the art, that the advisable temperature at which to work, and the time of carrying on the reaction, will be governed by the circumstances in any particular case.

When, as is desirable, an extender is used, 10 parts (by weight) of, for example, dry kieselguhr may be ground with 10 parts of caustic potash, and 80 parts of benzol for about 24 hours, that is, until a good suspension is obtained, and one part of the mixture used in place of the one part of the mixture of caustic and benzol above specified. Upon completion of the reaction, the earthy material may be removed by filtration. Conveniently, in cases where the extender is unaffected by the neutralizing acid used, as in the case of the hydrochloric acid and the kieselguhr, the filtering off of the extender and of the salts resulting from the neutralization may be done together in a single operation; but, should it for any reason be desired to use an extender affected by the neutralizing acid used, the extender may be filtered off prior to the addition of the acid.

The selection of the particular inert liquid preferable to use in any particular case may desirably depend somewhat upon the use to which the diacetone alcohol is to be put, and whether, for the expected use, the presence of the inert liquid would be objectionable. Thus, in many instances where the product of the process is to be used in the making of pyroxylin mixtures, the presence of a small percentage of, say, xylol, would be quite unobjectionable; and, at the same time, the unconverted acetone recovered would remain uncontaminated with a foreign material and hence be immediately available for further use in the process. In brief, the inert liquid to be preferred may vary, depending on whether it is desired to later remove the same from the diacetone alcohol formed, together with the unconverted acetone, or whether it would serve a given purpose better to allow it to remain in the finished product.

In the using of gasoline, the same general procedure as outlined may be used but, owing to the fact that gasoline and similar paraffin hydrocarbon derivatives have not constant boiling points, although the foreshot of the distillation would contain a small percentage of the lighter fractions in admixture with acetone, and the middle portion consist of substantially pure gasoline, yet the higher boiling tailings would probably remain in the diacetone alcohol. Generally speaking, the presence of this small amount of foreign material would be unobjectionable in nitrocellulose solutions, although the benzol-type of hydrocarbon is generally preferable.

The catalytic agent should be alkaline, substantially insoluble in the liquid dispersing medium, not react with such medium under the conditions of the process, and be substantially free from water; all for the reasons before indicated. As a practical matter, it appears that the hydroxides of the alkali metals, as potassium hydroxide and sodium hydroxide, best meet the conditions commercially, the former being preferable, in my experience, since more consistent results appear obtainable when it is used, when working at or below normal temperatures. At higher temperatures, the alkaline earth oxides or hydroxides may be desirable.

I claim:

1. The process for producing, by condensation, a ketonic alcohol from an aliphatic ketone which comprises treating the ketone with an alkaline condensing agent suspended in a liquid which is a non-solvent for the agent, and is miscible with the ketone.

2. The process for producing diacetone alcohol which comprises treating acetone with an alkaline condensing agent suspended in a liquid which is a non-solvent for the agent and is miscible with acetone.

3. The process for producing diacetone alcohol which comprises treating acetone with an alkaline condensing agent suspended in a liquid hydrocarbon which is a non-solvent for the agent and is miscible with acetone.

4. The process for producing diacetone alcohol which comprises treating acetone with an alkali metal hydroxide suspended in a liquid hydrocarbon.

5. The process for producing diacetone alcohol which comprises treating acetone with caustic potash suspended in benzol.

6. The process for producing diacetone alcohol which comprises treating acetone with caustic potash, in substantially the proportion of $\frac{1}{10}$ part of caustic to 99 of acetone, with the caustic suspended in benzol, in substantially the proportion of 1 part of caustic to 8 of benzol, and the benzol-caustic suspension carrying an inert earthy extender, in substantially the proportion of 1 part of extender to 9 of benzol-caustic.

In testimony whereof I affix my signature.

NORMAN W. THOMSON.